United States Patent
Garvin et al.

(10) Patent No.: US 9,244,661 B1
(45) Date of Patent: Jan. 26, 2016

(54) DYNAMIC FUNCTION WIZARD

(71) Applicant: The MathWorks, Inc., Natick, MA (US)

(72) Inventors: Christopher F. Garvin, Wellesley, MA (US); Roy Lurie, Wayland, MA (US)

(73) Assignee: The MathWorks, Inc., Natick, MA (US)

( * ) Notice: Subject to any disclaimer, the term of this patent is extended or adjusted under 35 U.S.C. 154(b) by 398 days.

(21) Appl. No.: 13/679,111

(22) Filed: Nov. 16, 2012

Related U.S. Application Data

(63) Continuation of application No. 11/749,991, filed on May 17, 2007, now Pat. No. 8,321,847.

(51) Int. Cl.
*G06F 9/44* (2006.01)
*G06F 9/45* (2006.01)

(52) U.S. Cl.
CPC ... *G06F 8/41* (2013.01); *G06F 8/34* (2013.01)

(58) Field of Classification Search
CPC ... G06F 8/35; G06F 11/3466; G06F 11/3688; G06F 8/34; G06F 8/41; H04L 9/3247
See application file for complete search history.

(56) References Cited

U.S. PATENT DOCUMENTS

| | | | |
|---|---|---|---|
| 6,711,576 B1 * | 3/2004 | Tuck et al. | |
| 7,086,041 B2 | 8/2006 | Plesko et al. | |
| 7,178,112 B1 | 2/2007 | Ciolfi et al. | |
| 7,350,192 B2 | 3/2008 | Seitz et al. | |
| 7,356,803 B2 * | 4/2008 | Bau, III | G06F 8/34 717/116 |
| 7,543,309 B2 * | 6/2009 | Forin | G06F 9/4411 717/162 |
| 7,627,853 B2 | 12/2009 | Ibert et al. | |
| 7,627,861 B2 | 12/2009 | Smith et al. | |
| 7,707,014 B2 * | 4/2010 | Kodosky | G06F 8/34 702/57 |
| 7,810,069 B2 * | 10/2010 | Charisius | G06F 8/20 717/106 |
| 7,853,937 B2 * | 12/2010 | Janczewski | G06F 8/314 712/203 |
| 8,112,744 B2 | 2/2012 | Geisinger | |
| 8,255,888 B2 * | 8/2012 | Jesse | G06F 8/34 717/143 |
| 8,321,847 B1 | 11/2012 | Garvin et al. | |
| 2001/0025231 A1 * | 9/2001 | Kodosky | G06F 8/34 703/13 |
| 2003/0066051 A1 | 4/2003 | Karr et al. | |
| 2003/0154468 A1 | 8/2003 | Gordon et al. | |
| 2005/0166193 A1 | 7/2005 | Smith et al. | |
| 2005/0198651 A1 * | 9/2005 | Weil et al. | 719/328 |
| 2008/0059951 A1 | 3/2008 | Francis et al. | |

OTHER PUBLICATIONS

Ellner et al., An introduction to Matlab for dynamic modeling, May 2006, 45 pages.*
S. McDirmid; "Living it up with a live programming language"; Oct. 2007, 15 pages, http://delivery.acm.org/10.1145/1300000/1297073/p623-mcdirmid.pdf.
Joisha et al.; "An algebraic array shape inference system for MATLAB"; Sep. 2006, 60 pages, http://delivery.acm.org/10.1145/1160000/1152651/p848-joisha.pdf.

* cited by examiner

*Primary Examiner* — Thuy Dao
(74) *Attorney, Agent, or Firm* — Harrity & Harrity, LLP

(57) ABSTRACT

A device receives selection of a function category associated with a dynamically-type programming language, receives selection of a function associated with the selected function category, dynamically generates one or more function signatures associated with the selected function, and stores at least a subset of the one or more function signatures in a memory or displays at least a subset of the one or more function signatures to a user.

19 Claims, 9 Drawing Sheets

DYNAMIC FUNCTION WIZARD

RELATED APPLICATION

This application is a continuation of U.S. patent application Ser. No. 11/749,991 filed May 17, 2007, the disclosure of which is incorporated herein by reference.

BACKGROUND

Currently, certain host applications (e.g., Microsoft Excel) offer links to functions available from other applications (e.g., MATLAB® by The MathWorks, Inc.). For example, MATLAB® may be available to Microsoft Excel via Excel Link, a product provided by The Mathworks, Inc. Excel Link enables a user to manually type commands related to functions available from MATLAB®. This may permit a Microsoft Excel user to perform functions that are not be available in Microsoft Excel, but are available in MATLAB® (e.g., advanced data analysis, visualization, etc.). Host applications, such as Microsoft Excel, offer a function help feature or wizard that provides a listing of functions available from Microsoft Excel, as well as a brief description of each of the available functions.

However, the function help feature of host applications typically does not provide a listing of functions available from other applications, such as MATLAB®. Further, the function help feature of host applications does not provide multiple function call sequences or signatures for each function, but rather provides a single function signature that represents all permutations of the function by visually indicating required and optional arguments (e.g., the function "SUM" in Microsoft Excel has a single function signature of "SUM (number1, number 2, . . . )").

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

Figure 1:
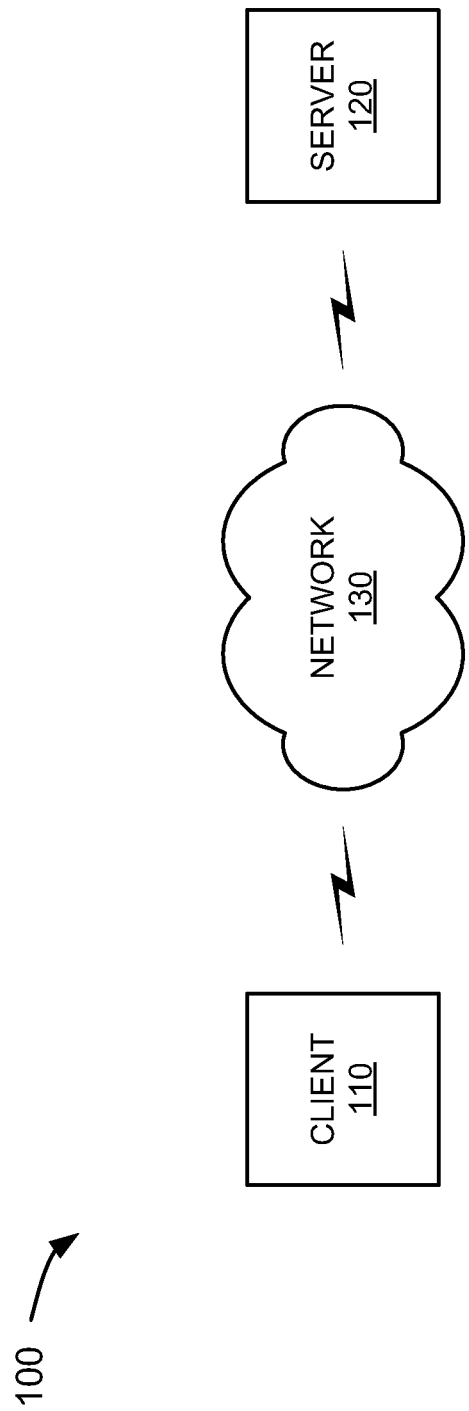
FIG. 1 is an exemplary diagram of a network in which systems and methods described herein may be implemented.

The following detailed description refers to the accompanying drawings. The same reference numbers in different drawings may identify the same or similar elements. Also, the following detailed description does not limit the invention.

Overview

Implementations described herein may provide a function wizard for dynamically generating a list of function signatures associated with an application (e.g., a dynamically-typed programming language) accessed by a host application. For example, in one implementation, the dynamic function wizard may resolve or determine a list of function categories associated with the accessed application, and may generate a list of functions associated with each function category. If a user selects a function, the dynamic function wizard may query a help file associated with the selected function, and may dynamically parse the help file to generate potential function signatures. The dynamic function wizard may filter the potential function signatures to generate valid function signatures, may format the valid function signatures, and may output the formatted valid function signatures for selection by the user. If the user selects a valid function signature, the dynamic function wizard may permit the user to enter variables associated with the selected function signature, and may provide the resulting formula to the host application. Alternatively, the dynamic function wizard may auto populate the selected function signature with one or more variables.

The function wizard described herein may provide a dynamic, scalable mechanism for generating a list of function signatures via a dynamic storage device (i.e., the list may be dynamically generated in resident memory), rather than via access of a static storage device. By not accessing a static storage device, the list of function signatures may be generated quickly and easily. If functions are added to the accessed application (e.g., a user-created function), the function wizard may dynamically generate the function signatures associated with the newly-created functions (i.e., the function wizard is scalable). If the help file associated with a function is modified, the function wizard may dynamically alter the function signatures associated with the modified help file.

A "function," as the term is used herein, is to be broadly interpreted to include any mechanism that associates a unique output for each input of a specified type (e.g., a real number, an element of a set, etc.) and that may be represented in a variety of ways (e.g., by a formula, by a plot or graph, by an algorithm that computes it, by a description of its properties, etc.). For example, a function may include any function provided by a technical computing environment (e.g., MATLAB®); any function provided by any application that includes functions (e.g., spreadsheet applications, such as Microsoft Excel, Lotus 1-2-3, etc.), etc.

A "function signature," as the term is used herein, is to be broadly interpreted to include any syntax, format, form, arrangement, call sequence, etc. associated with a particular function. For example, in Microsoft Excel, the function "SUM" may have a single function signature of "SUM(number1, number2, . . . )," where "number1, number2, . . . " are one to thirty arguments for which a user may want the total value or sum. In MATLAB®, the function "RAND" may have multiple function signatures (e.g., RAND(N) which returns an N-by-N matrix containing pseudo-random values drawn from a uniform distribution on a unit interval; RAND(M, N) which returns an M-by-N matrix; RAND(SIZE(A)) which returns an array the same size as A; etc.).

A "technical computing environment," as the term is used herein, is to be broadly interpreted to include any hardware and/or software based logic that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In one implementation, a technical computing environment may include a dynamically-typed programming language (e.g., the M language) that can be used to express problems and/or solutions in mathematical notations. For example, a technical computing environment may use an array as a basic element, where the array may not require dimensioning. In addition, a technical computing environment may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

A technical computing environment may further provide mathematical functions and/or graphical tools (e.g., for creating plots, surfaces, images, volumetric representations, etc.). In one implementation, a technical computing environment may provide these functions and/or tools using toolboxes (e.g., toolboxes for signal processing, image processing, data plotting, parallel processing, etc.). In another implementation, a technical computing environment may provide these functions as block sets. In still another implementation, a technical computing environment may provide these functions in another way, such as via a library, etc.

A technical computing environment may be implemented as a text-based environment (e.g., MATLAB®; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; etc.), a graphically-based environment (e.g., Simulink®, Stateflow®, SimEvents™, etc., by The MathWorks, Inc.; VisSim by Visual Solutions; Lab-View® by National Instruments; Dymola by Dynasim; Soft-WIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; aspects of a Unified Modeling Language (UML) or SysML environment; etc.), or another type of environment, such as a hybrid environment that includes one or more of the above-referenced text-based environments and one or more of the above-referenced graphically-based environments.

Exemplary Network Configuration

FIG. 1 is an exemplary diagram of a network 100 in which systems and methods described herein may be implemented. Network 100 may include a client 110 and a server 120 connected via a network 130. One client 110 and one server 120 have been illustrated in FIG. 1 as connected to network 130 for simplicity. In practice, there may be more clients and/or servers. Also, in some instances, a client may perform one or more functions described herein as being performed by a server and a server may perform one or more functions described herein as being performed by a client.

Client 110 may include one or more entities. An entity may be defined as a device, such as a personal computer, a personal digital assistant (PDA), a laptop, or another type of computation or communication device, a thread or process running on one of these devices, and/or an object executable by one of these devices.

Server 120 may include one or more server entities that gather, process, search, and/or provide information in a manner described herein. For example, in one implementation, server 120 may be configured to provide access to one or more host applications, applications accessed by host applications, and/or dynamic function wizards. In another implementation, server 120 may provide access to a web service (e.g., a web service that provides access one or more host applications, applications access by host application, and/or dynamic function wizards). A "web service," as the term is used herein, is to be broadly interpreted to include a software application that allows machine-to-machine communications over a network (e.g., network 130). For example, a server (e.g., server 120) may communicate with a client (e.g., client 110) using an application program interface (API) that the client may access over the network. In one embodiment, the server may exchange Hypertext Markup Language (HTML), Extensible Markup Language (XML), or other types of messages with the client using industry compatible standards (e.g., simple object access protocol (SOAP)) and/or proprietary standards. A web service may further include network services that can be described using industry standard specifications such as web service definition language (WSDL) and/or proprietary specifications.

Network 130 may include a local area network (LAN), a wide area network (WAN), a metropolitan area network (MAN), a telephone network, such as the Public Switched Telephone Network (PSTN) or a cellular telephone network, an intranet, the Internet, or a combination of networks. Client 110 and server 120 may connect to network 130 via wired and/or wireless connections.

In one implementation, client 110 may include a host application (e.g., Microsoft Excel) capable of using functions provided by a technical computing environment application. In another implementation, client 110 may access, from server 120 (e.g., via network 130), a host application capable of using functions provided by a technical computing environment application. In other implementations, the host application and/or the technical computing environment application may be provided in client 110 and/or server 120. If the host application and the technical computing environment application are provided in client 110, network 130 may be omitted and client 110 may function as a standalone device. In still other implementations, the host application may be omitted and the technical computing environment application may be provided in client 110 and/or server 120. If the technical computing environment application is provided in client 110, network 130 may be omitted and client 110 may function as a standalone device. In a further implementation, a dynamic function wizard, as described herein, may be associated with the host application and/or the technical computing environment.

Although FIG. 1 shows exemplary components of network 100, in other implementations, network 100 may contain fewer, different, or additional components than depicted in FIG. 1.

Exemplary Client/Server Configuration

Figure 2:
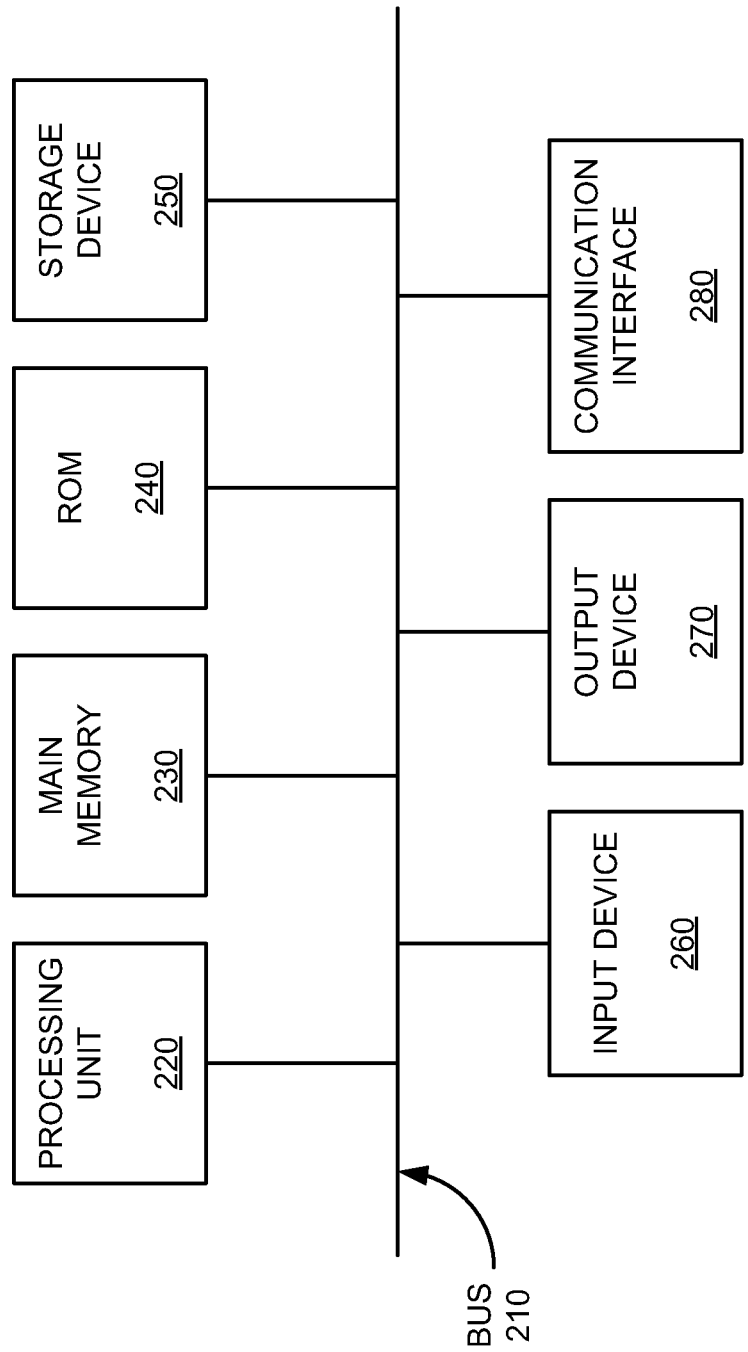
FIG. 2 is an exemplary diagram of a client and/or a server of FIG. 1.

FIG. 2 is an exemplary diagram of a client/server entity corresponding to client 110 and/or server 120. As illustrated, the client/server entity may include a bus 210, a processing unit 220, a main memory 230, a read-only memory (ROM) 240, a storage device 250, an input device 260, an output device 270, and/or a communication interface 280. Bus 210 may include a path that permits communication among the components of the client/server entity.

Processing unit 220 may include a processor, microprocessor, or other types of processing logic that may interpret and execute instructions. In one implementation, processing unit 220 may include a single core processor or a multi-core processor. In another implementation, processing unit 220 may include a single processing device or a group of processing devices, such as a processor cluster or computing grid. In still another implementation, processing unit 220 may include multiple processors that may be local or remote with respect each other, and may use one or more threads while processing. In a further implementation, processing unit 220 may include multiple processors implemented as units of execution capable of running copies of a technical computing environment. As used herein, the term "unit of execution" may refer to a device that performs parallel processing activities. For example, a unit of execution may perform parallel processing activities in response to a request received from a client. A unit of execution may perform substantially any type of parallel processing, such as task, data, or stream processing, using one or more devices. For example in one implementation, a unit of execution may include a single processing device that includes multiple cores and in another implementation, the unit of execution may include a number of processors. Devices used in a unit of execution may be arranged in substantially any configuration (or topology), such as a grid, ring, star, etc.

Main memory 230 may include a random access memory (RAM) or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive, or another type of static storage device (e.g., a disk drive) that may store static information and/or instructions for use by processing unit 220.

Input device 260 may include a mechanism that permits an operator to input information to the client/server entity, such as a keyboard, a mouse, a pen, a microphone, voice recognition and/or biometric mechanisms, etc. Output device 270 may include a mechanism that outputs information to the operator, including a display, a printer, a speaker, etc. Communication interface 280 may include any transceiver-like mechanism that enables the client/server entity to communicate with other devices and/or systems. For example, communication interface 280 may include mechanisms for communicating with another device or system via a network, such as network 130.

As will be described in detail below, the client/server entity may perform certain operations in response to processing unit 220 executing software instructions contained in a computer-readable medium, such as main memory 230. A computer-readable medium may be defined as a physical or logical memory device and/or carrier wave. The software instructions may be read into main memory 230 from another computer-readable medium, such as storage device 250, or from another device via communication interface 280. The software instructions contained in main memory 230 may cause processing unit 220 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows exemplary components of the client/server entity, in other implementations, the client/server entity may contain fewer, different, or additional components than depicted in FIG. 2. In still other implementations, one or more components of the client/server entity may perform the tasks performed by one or more other components of the client/server entity.

Exemplary Computer-Readable Medium

Figure 3:
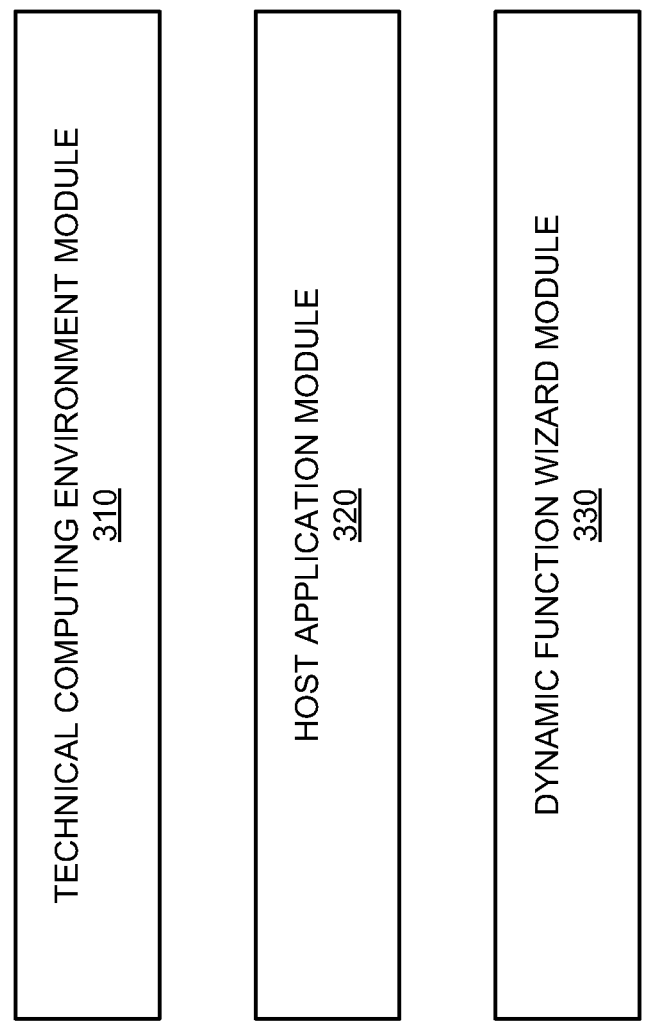
FIG. 3 is a diagram of a portion of an exemplary computer-readable medium that may be associated with the client and/or the server of FIGS. 1 and 2.

FIG. 3 is a diagram of a portion of an exemplary computer-readable medium 300 that may be associated with client 110 and/or server 120. In one implementation, computer-readable medium 300 may correspond to main memory 230, ROM 240, and/or storage device 250 of client 110 and/or server 120. In other implementations, computer-readable medium 300 may be associated with another device separate from client 110 and/or server 120, and may accessed by client 110 and/or server 120 via communication interface 280 and network 130.

The portion of computer-readable medium 300 illustrated in FIG. 3 may include a technical computing environment module 310, a host application module 320, and a dynamic function wizard module 330. In one implementation, technical computing environment module 310, host application module 320, and dynamic function wizard module 330 may be provided in server 120 (e.g., and may be accessible by client 110 via communication interface 280). In another implementation, technical computing environment module 310, host application module 320, and dynamic function wizard module 330 may be provided in client 110 (e.g., as a standalone device), and server 120 and network 130 may be omitted. In other implementations, one or more of technical computing environment module 310, host application module 320, and dynamic function wizard module 330 may be provided in client 110, and the remaining one or more of technical computing environment module 310, host application module 320, and dynamic function wizard module 330 may be provided in server 120 (e.g., and may be accessible by client 110 via communication interface 280). In still other implementations, one or more of technical computing environment module 310, host application module 320, and dynamic function wizard module 330 may be incorporated into or be part of another module (e.g., dynamic function wizard module 330 may be incorporated into technical computing environment module 310).

Technical computing environment module 310 may include any hardware and/or software based logic that includes any of the features defined above with respect to the term "technical computing environment." For example, in one implementation, technical computing environment module 310 may include MATLAB® software that provides a variety of mathematical functions and/or graphical tools using toolboxes, as block sets, via a library, etc. In other implementations, technical computing environment module 310 may include any application that may benefit from a dynamic function wizard as described herein.

Host application module 320 may include any hardware and/or software based logic capable of cooperating with technical computing environment module 310 and utilizing the functions and/or graphical tools provided by technical computing environment module 310. For example, in one implementation, host application module 320 may include any application that includes functions (e.g., spreadsheet applications, such as Microsoft Excel, Lotus 1-2-3, etc.) and/or is capable of utilizing functions (e.g., from a dynamically-typed programming language). In other implementations, host application module 320 may include any application that may benefit from a dynamic function wizard as described herein.

Dynamic function wizard module 330 may include any hardware and/or software based logic that provides a dynamic, scalable mechanism for generating a list of function signatures associated with an application (e.g., technical computing environment module 310) that may or may not be provided within a host application (e.g., host application module 320). Dynamic function wizard module 330 may dynamically generate the list of function signatures via a dynamic storage device (e.g., main memory 230). Such dynamic generation of function signatures may be faster than if the list of function signatures is retrieved from a static storage device.

In one implementation, dynamic function wizard module 330 may resolve or determine a list of function categories associated with technical computing environment module 310, and may generate a list of functions associated with each function category. If a user selects a function category, dynamic function wizard module 330 may receive the selected function category and may generate a list of functions associated with the selected function category. If a user selects a function, dynamic function wizard module 330 may receive the selected function, may query a help file (e.g., provided by technical computing environment module 310) associated with the selected function, and may dynamically parse the help file to generate potential function signatures. Dynamic function wizard module 330 may filter the potential function signatures to generate valid function signatures, may format the valid function signatures, and may output the formatted valid function signatures for selection by the user. If the user selects a valid function signature, dynamic function wizard module 330 may permit the user to enter variables associated with the selected function signature. If functions are added to (or modified within) technical computing environment module 310 and/or host application module 320, dynamic function wizard 330 may dynamically generate the function signatures associated with such added/modified functions.

Although FIG. 3 shows exemplary modules of computer-readable medium 300, in other implementations, computer-readable medium 300 may contain fewer, different, or additional modules than depicted in FIG. 3. For example, computer-readable medium 300 may include an operating system (e.g., UNIX, LINUX, Windows NT, etc.) capable of supporting technical computing environment module 310, host application module 320, and/or dynamic function wizard module 330. In still other implementations, one or more modules of computer-readable medium 300 may perform the tasks performed by one or more other modules of computer-readable medium 300. In one example, dynamic function wizard module 330 may cooperate with technical computing environment module 330, and host application module 320 may be omitted.

Exemplary Functional Operation of Client/Server

Figure 4:
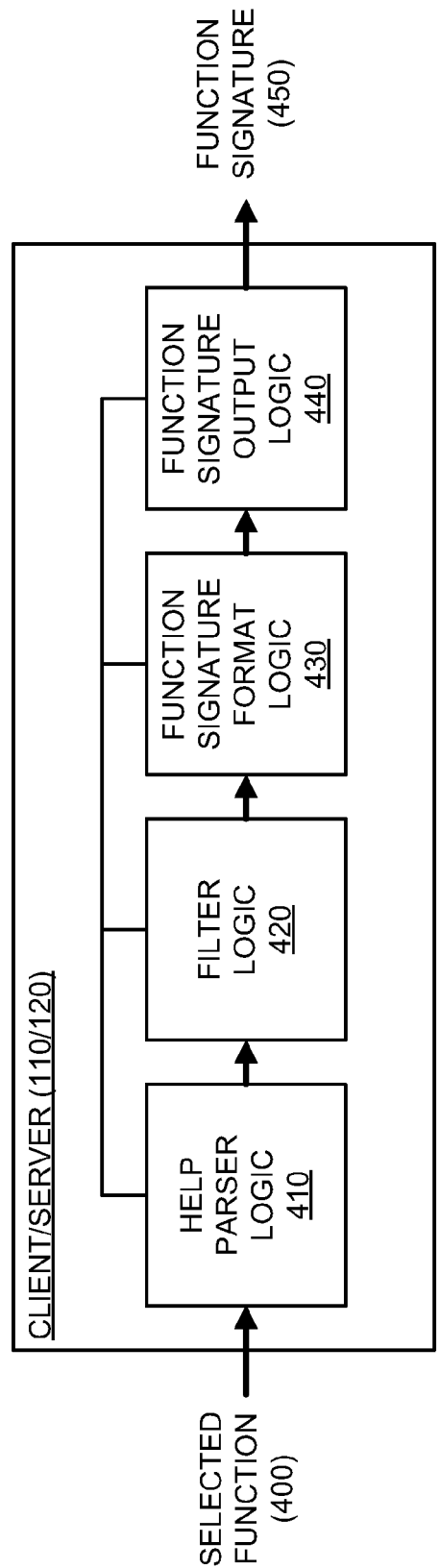
FIG. 4 is a diagram depicting exemplary functions capable of being performed by the client and/or the server of FIGS. 1 and 2.

FIG. 4 is a diagram depicting exemplary functions capable of being performed by client 110 and/or server 120 (hereinafter "client/server 110/120"). As illustrated, client/server 110/120 may include a variety of functional components or logic that may be used to dynamically generate one or more function signatures associated with a user-selected function 400. For example, client/server 110/120 may include help parser logic 410, filter logic 420, function signature format logic 430, and/or function signature output logic 440. In one implementation, help parser logic 410, filter logic 420, function signature format logic 430, and/or function signature output logic 440 may correspond to functions performed by a software application (e.g., dynamic function wizard module 330) contained in a memory (e.g., main memory 230, ROM 240, and/or storage device 250) of client/server 110/120. Although not shown in FIG. 4, prior to receiving user-selected function 400, client/server 110/120 may resolve or determine a list of function categories associated with an application (e.g., technical computing environment module 310), and may generate a list of functions associated with each function category. A user may select user-selected function 400 from the list of functions.

Help parser logic 410 may receive user-selected function 400, and may query a help file or header (e.g., provided by technical computing environment module 310) associated with user-selected function 400. Help parser logic 410 may dynamically parse the help file to generate potential function signatures, and may provide the generated potential function signatures to filter logic 420. In one implementation, help parser logic 410 may parse a help file associated with user-selected function 400, and/or may parse actual code or instructions associated with user-selected function 400. The help file may or may not be located with the actual code (e.g., within client 110 and/or server 120). In another implementation, help parser logic 410 may parse the help file and/or the actual code associated with user-selected function 400 using a dynamically-typed programming language (e.g., the M language). In other implementations, help parser logic 410 may parse the help file and/or the actual code associated with user-selected function 400 using other programming languages (e.g., Visual Basic for Application (VBA), C++, C, Fortran, Pascal, etc.).

In one exemplary implementation, a centralized repository may be provided with a memory (e.g., main memory 230, ROM 240, and/or storage device 250) of client/server 110/120, and may be used to store information that may be accessed by the dynamic function wizard described herein. In one example, the centralized repository may store the function categories and/or the functions and/or help information associated with the function categories. In another example, if a user creates a new function (as described herein), help information associated with the new function may be stored or linked to the centralized repository. The dynamic function wizard may look to the centralized repository for the help information displayed to a user for a selected function. An example of a centralized repository may include a central server that includes MATLAB® and permits users to contribute material. The centralized repository may be updated as new material is added.

Filter logic 420 may receive the potential function signatures from help parser logic 410, and may prescreen any invalid function signatures. For example, in one implementation, filter logic 420 may attempt to execute functions associated with the potential function signatures. If a potential function signature creates an error (or is invalid) during execution, filter logic 420 may screen or filter out the invalid potential function signature, and may generate a list of valid function signatures. Filter logic 420 may provide the list of valid function signatures to function signature format logic 430.

Function signature format logic 430 may receive the list of valid function signatures from filter logic 420, and may provide formatting for the list of valid function signatures. In one implementation, function signature format logic 430 may provide mechanisms (e.g., menus, lists, etc.) for creating a list of function categories, a list of functions associated with each function category, a list of valid function signatures associated with each function, and help information associated with each function. For example, function signature format logic 430 may create a list of function categories, and, if the user selects a function category, may create a list of functions associated with the selected function category. If the user selects a function, function signature format logic 430 may create a list of valid function signatures and help information associated with the selected function. Function signature format logic 430 may provide the formatted information to function signature output logic 440.

Function signature output logic 440 may receive the formatted information from function signature format logic 430, and may provide a variety of output options for the formatted information. As shown in FIG. 4, function signature output logic 440 may output one or more function signatures 450. In one implementation, as further described below in connection with FIGS. 5-7, function signature output logic 440 may provide mechanisms (e.g., user interfaces) for displaying the list of function categories, the list of functions associated with each function category, and the list of valid function signatures and help information associated with each function. In another implementation, function signature output logic 440 may convert the formatted information into another format (e.g., may convert a MATLAB® function into a Microsoft Excel macro), and may store the converted information (e.g., within main memory 230, ROM 240, and/or storage device 250 of client/server 110/120).

Although FIG. 4 shows exemplary functional components of client/server 110/120, in other implementations, client/server 110/120 may contain fewer, different, or additional functional components than depicted in FIG. 4. In still other implementations, one or more functional components of client/server 110/120 may perform the tasks performed by one or more other functional components of client/server 110/120.

Exemplary Dynamic Function Wizard User Interfaces

Figure 5:
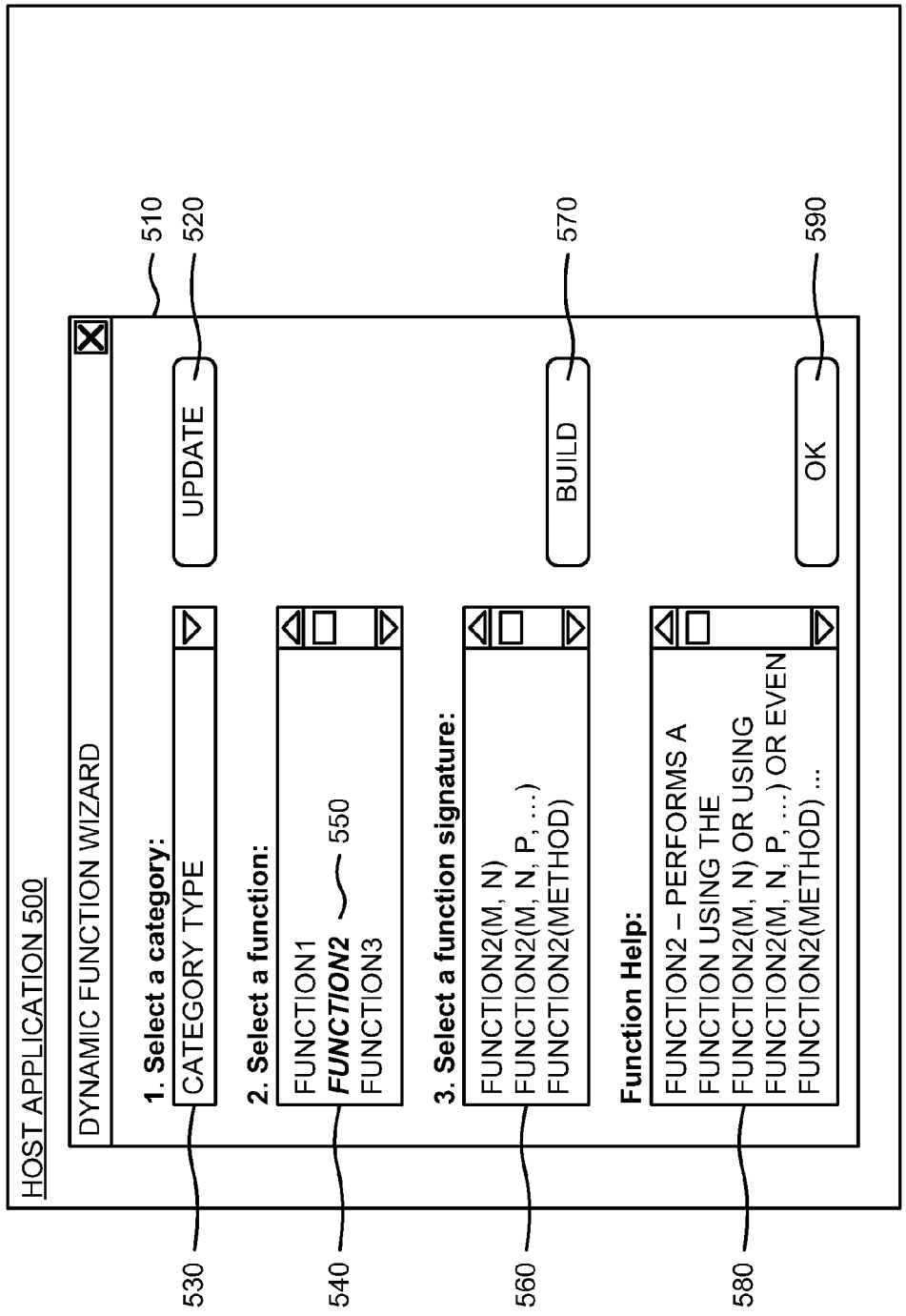
FIG. 5 depicts an exemplary user interface associated with the client and/or the server of FIGS. 1 and 2 that can be used to display a function wizard within an application.
Figure 6:
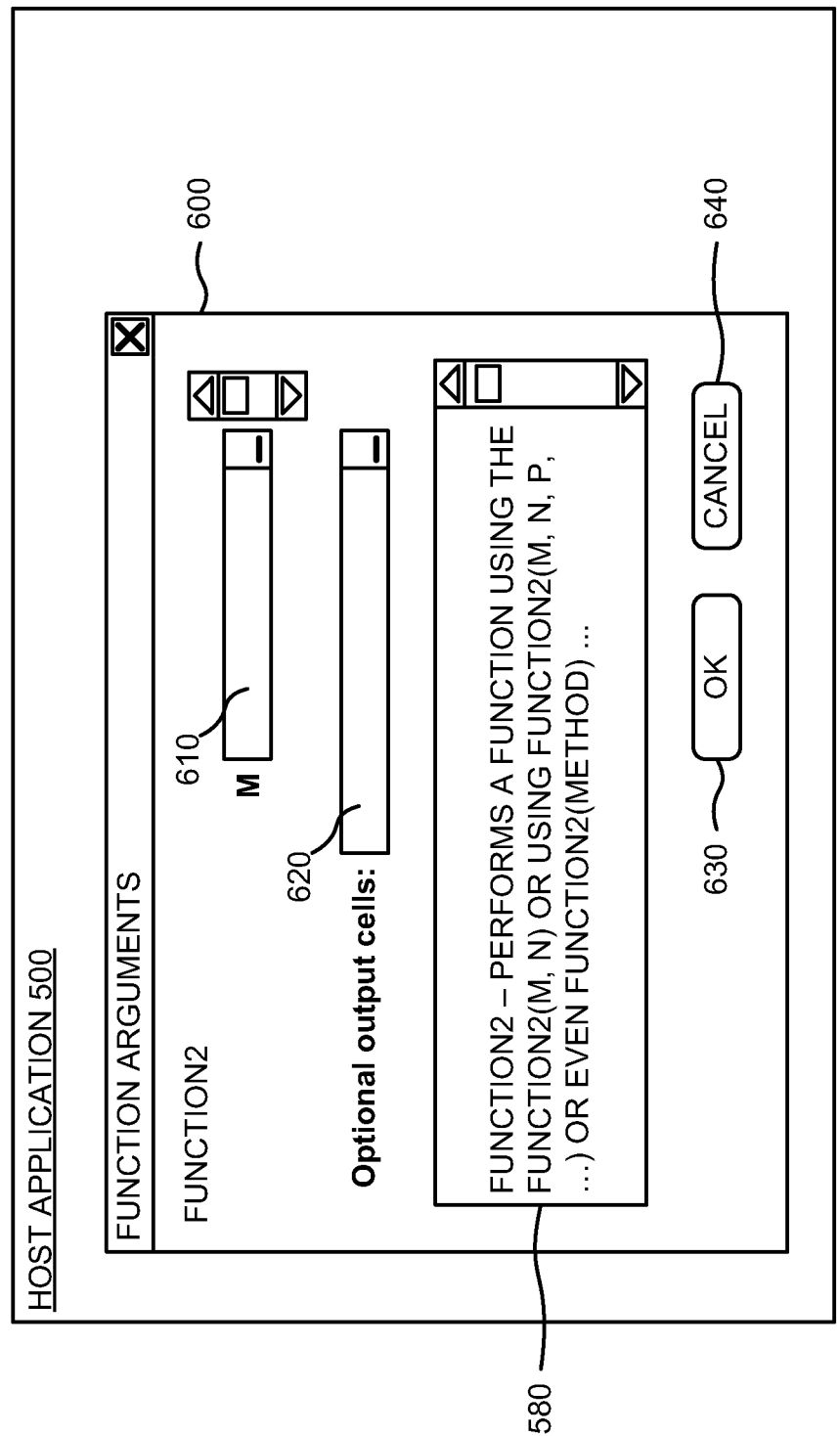
FIG. 6 illustrates an exemplary user interface associated with the client and/or the server of FIGS. 1 and 2 that can be used to display function arguments associated with a selected function signature.
Figure 7:
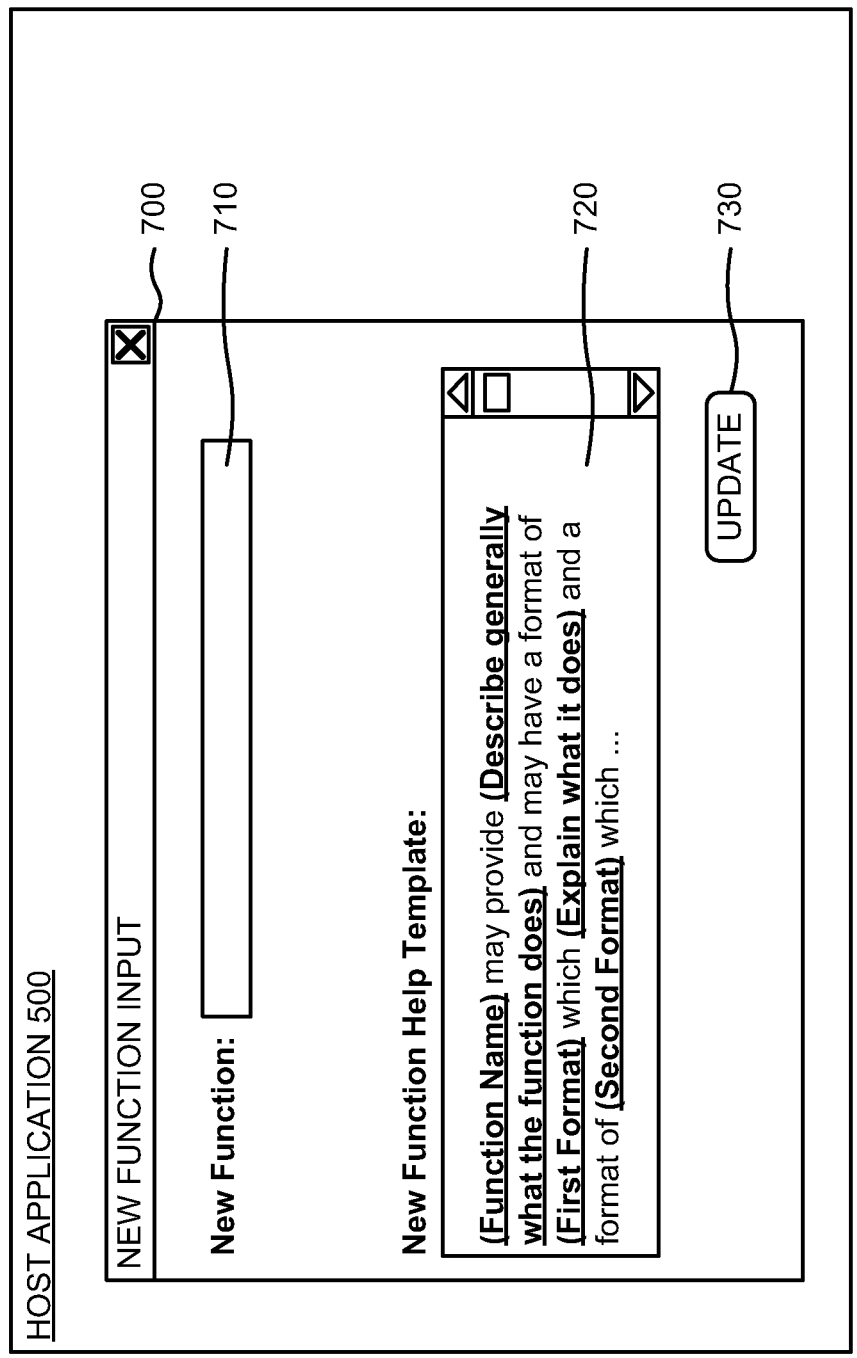
FIG. 7 depicts an exemplary user interface associated with the client and/or the server of FIGS. 1 and 2 that can be used to create a new function and function help associated with the new function.

FIGS. 5-7 depict exemplary user interfaces associated with client 110 and/or server 120. The user interfaces described herein may be graphical user interfaces (GUIs) or non-graphical user interfaces, such as text-based interfaces. The user interfaces may further provide information to users via customized interfaces (e.g., proprietary interfaces) and/or other types of interfaces (e.g., browser-based interfaces). The user interfaces may receive user inputs via input devices (e.g., input device 260 of client/server 110/120, etc.), may be user configurable (e.g., a user may change the size of the user interface, information displayed in a user interface, color schemes used by the user interface, positions of text, images, icons, windows, etc., in the user interface, etc.), and/or may not be user configurable. The user interfaces may be displayed to a user via one or more output devices (e.g., output device 270 of client/server 110/120, etc.).

The user interface of FIG. 5 may be used to display a host application 500, and a dynamic function wizard 510 within host application 500. Host application 500 may include any application capable of utilizing functions and/or graphical tools provided by a technical computing environment, any application that includes functions and/or is capable of utilizing functions, and/or any application that may benefit from a dynamic function wizard as described herein. In one implementation, host application 500 may correspond to host application module 320 of computer-readable medium 300.

Dynamic function wizard 510 may provide a dynamic, scalable mechanism for generating a list of function signatures associated with an application (e.g., a technical computing environment). In one implementation, dynamic function wizard 510 may be provided by dynamic function wizard module 330 of computer-readable medium 300. Dynamic function wizard 510 may include an update mechanism 520, a category section 530, a function section 540 (which may include a selected function 550), a function signature section 560, a build mechanism 570, a function help section 580, and/or an OK mechanism 590.

Update mechanism 520 may include a mechanism (e.g., an icon, link, button, and/or other similar selection mechanisms) that may be selected if the user hovers over or clicks on the mechanism. If update mechanism 520 is selected, dynamic function wizard 510 may permit a user to create a function (as described below in connection with FIG. 7), as well as associated function signatures and help.

Category section 530 may provide a list of function categories associated with an application (e.g., technical computing environment module 310). Dynamic function wizard 510 may resolve or determine a list of function categories associated with the application (e.g., technical computing environment module 310). Category section 530 may display the list of function categories in a variety of ways (e.g., a window with a list, a drop-down menu, etc.).

Function section 540 may provide a list of functions (e.g. "FUNCTION1," "FUNCTION2," etc.) associated with a function category selected by a user from category section 530. Function section 540 may provide a corresponding list of functions associated with any of the function categories provided in category section 530. Dynamic function wizard 510 may generate the list of functions associated with each function category, and a user may select a function from the list of functions. For example, as shown in FIG. 5, a user may select function 550 (e.g., "FUNCTION2") from the list of functions provided in function section 540. Function section 540 may display the list of functions in a variety of ways (e.g., a window with a list, a drop-down menu, etc.).

If a user selects a function from function section 540 (e.g., function 550), function signature section 560 may provide a list of function signatures associated with the selected function. For example, as shown in FIG. 5, function signature section 560 may provide a list of function signatures (e.g., "FUNCTION2(M, N)," "FUNCTION2(M, N, P, . . . )," etc.) associated with function 550. Dynamic function wizard 510 may query a help file associated with the selected function (e.g., function 550), and may dynamically parse the help file to generate potential function signatures. Dynamic function wizard 510 may filter the potential function signatures to generate valid function signatures, may format the valid function signatures, and may output the formatted valid function signatures for selection by the user in function signature section 560. If the user selects a valid function signature, dynamic function wizard 510 may permit the user to enter variables associated with the selected function signature, as described below in connection with FIG. 6. Function signature section 560 may display the list of function signatures in a variety of ways (e.g., a window with a list, a drop-down menu, etc.).

Build mechanism 570 may include a mechanism (e.g., an icon, link, button, and/or other similar selection mechanisms) that may be selected if the user hovers over or clicks on the mechanism. If build mechanism 570 is selected, dynamic function wizard 510 may convert a function signature of an application (e.g., technical computing environment module 310) into a function signature that may be deployed in host application 500. For example, in one implementation, dynamic function wizard 510 may convert a MATLAB® function signature into a Microsoft Excel macro, an add-in application, and/or a standalone application.

If a user selects a function from function section 540 (e.g., function 550), function help section 580 may provide a help file associated with the selected function. A corresponding help file may be provided for each function provided in function section 540. For example, as shown in FIG. 5, function help section 580 may provide a help file (e.g., "FUNCTION2—PERFORMS A FUNCTION USING THE FUNCTION2(M, N) . . . ") associated with function 550. The help file provided by function help section 580 may be the help file that is parsed by dynamic function wizard 510 to generate potential function signatures, as described above.

OK mechanism 590 may include a mechanism (e.g., an icon, link, button, and/or other similar selection mechanisms) that may be selected if the user hovers over or clicks on the mechanism. If OK mechanism 590 is selected, dynamic function wizard 510 may cease being displayed within host application 500.

The user interface of FIG. 6 may be used to display a function arguments window 600 associated with a selected function and function signature (e.g., the user interface of FIG. 6 may be displayed if a function signature is selected from function signature section 560). In one implementation, function arguments window 600 may be provided by dynamic function wizard module 330 of computer-readable medium 300. Function arguments window 600 may include a variable input mechanism 610, an optional output cells input mechanism 620, a function help section 580 (described above), an OK mechanism 630, and/or a CANCEL mechanism 640.

Variable input mechanism 610 may include a mechanism (e.g., an input field, a drop-down menu, and/or other similar input mechanisms) that may be selected if the user hovers over or clicks on the mechanism. If variable input mechanism 610 is selected, a user may input variables associated with the selected function signature. For example, if the user selected function 550 (FIG. 5) and selected "FUNCTION2(M, N)" as the function signature, then variable input mechanism 610 may permit the user to input the variables "M" and "N."

Optional output cells input mechanism 620 may include a mechanism (an input field, a drop-down menu, and/or other similar mechanisms) that may be selected if the user hovers over or clicks on the mechanism. If optional output cells input mechanism 620 is selected, a user may input a location within host application 500 where the selected function may be provided. For example, if host application 500 is Microsoft Excel, optional output cells input mechanism 620 may permit a user to input a cell or a range of cells of a spreadsheet. The elected function may be provided at the input cell or range of cells of the spreadsheet.

OK mechanism 630 may include a mechanism (e.g., an icon, link, button, and/or other similar selection mechanisms) that may be selected if the user hovers over or clicks on the mechanism. If OK mechanism 630 is selected, function arguments window 600 may accept the variables input by variable input mechanism 610 and/or the cell(s) input by optional output cells input mechanism 620, and/or may cease being displayed within host application 500. OK mechanism 630 may also cause dynamic function wizard 510 to provide the selected function signature (including the variables input by variable input mechanism 610) to host application 500 (e.g., at cell(s) input by optional output cells input mechanism 630).

CANCEL mechanism 640 may include a mechanism (e.g., an icon, link, button, and/or other similar selection mechanisms) that may be selected if the user hovers over or clicks on the mechanism. If CANCEL mechanism 640 is selected, function arguments window 600 may cease being displayed within host application 500, without accepting the variables input by variable input mechanism 610 and/or the cell(s) input by optional output cells input mechanism 620.

If the user selects update mechanism 520 (FIG. 5), the user interface of FIG. 7 may be displayed, and may be used to create a new function and function signatures and help associated with the new function. As illustrated, a new function input window 700 may be displayed, and may include a new function input mechanism 710, a new function help template 720, and/or an update mechanism 730. In one implementation, new function input window 700 may be provided by dynamic function wizard module 330 of computer-readable medium 300.

New function input mechanism 710 may include a mechanism (e.g., an input field, a drop-down menu, and/or other similar input mechanisms) that may be selected if the user hovers over or clicks on the mechanism. If new function input mechanism 710 is selected, a user may input a new function. For example, if the user is using MATLAB®, a user may create a new function using new function input mechanism 710. The new function may be input in a format compatible with an application (e.g., MATLAB®), and/or may be converted into a format compatible with host application 500.

New function help template 720 may include a template that permits the user to create a help file for the newly-created function (e.g., provided via new function input mechanism 710). In one implementation, the template may include a predetermined format with input fields for the user to supply information related to the newly-created function. For example, the input fields may include an input field providing the "Function Name," an input field describing generally the task(s) performed by the new function, an input field providing a first function signature related to the new function, an input field describing generally the task(s) performed by the first function signature, etc. Such an arrangement may aid in parsing the help file for the new function, in order to dynamically generate the function signatures associated with the new function. Although FIG. 7 shows an exemplary new function help template 720, in other implementations new function help template 720 may include other arrangements and may be in a variety of formats (e.g., HyperText Markup Language (HTML), etc.).

If the user inputs the new function (e.g., via new function input mechanism 710) and the new function help (e.g., via new function help template 720), the user may select update mechanism 730. Update mechanism 730 may include a mechanism (e.g., an icon, link, button, and/or other similar selection mechanisms) that may be selected if the user hovers over or clicks on the mechanism. If update mechanism 730 is selected, dynamic function wizard 510 may store the help file (e.g., created via new function help template 720), may dynamically parse the help file to generate potential function signatures associated with the new function, may filter the potential function signatures to generate a list of valid function signatures, may format the list of valid function signatures, and may output the formatted, valid function signatures, as described above.

Although FIGS. 5-7 show exemplary components of user interfaces, in other implementations, the user interfaces may contain fewer, different, or additional components than depicted in FIGS. 5-7. In still other implementations, one or more components of the user interfaces of FIGS. 5-7 may perform the tasks performed by one or more other components of the user interfaces.

Exemplary Process

Figure 8:
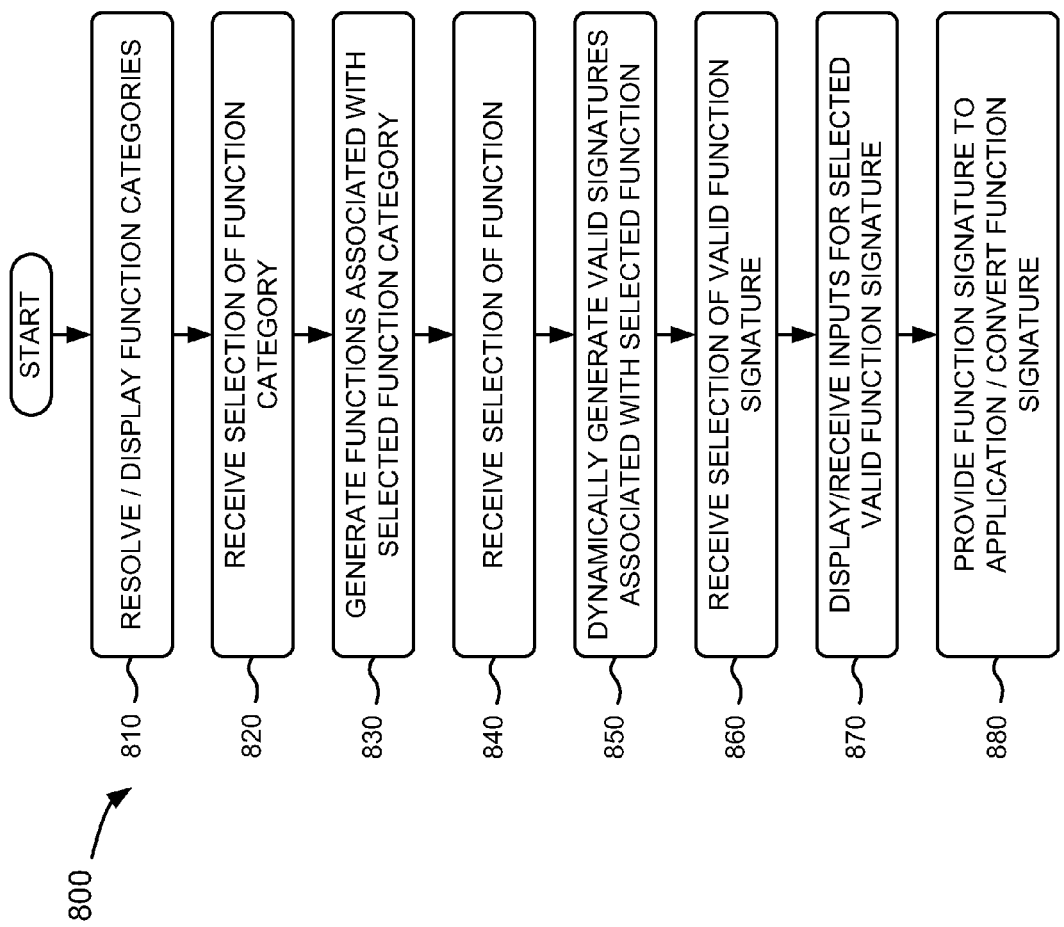
FIGS. 8 and 9 depict a flow chart of an exemplary process according to implementations described herein.
Figure 9:
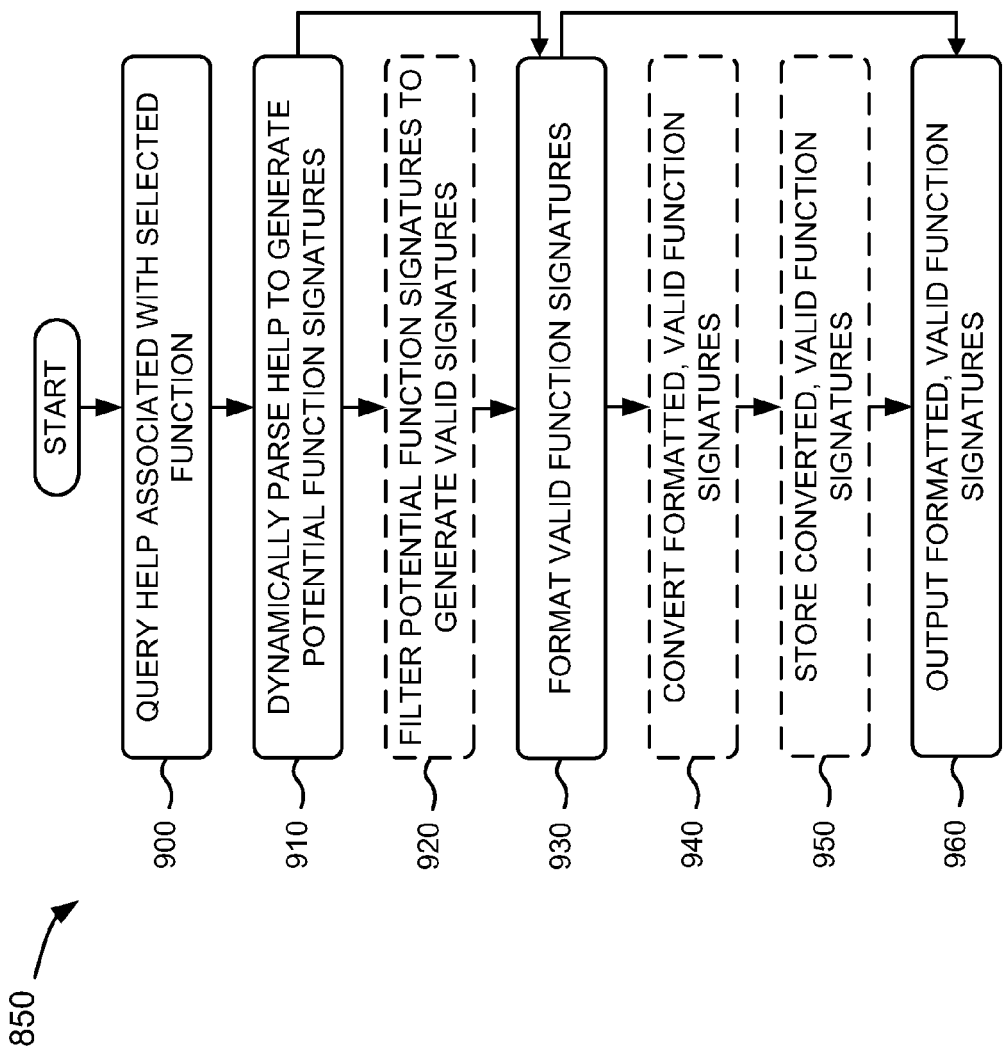

FIGS. 8 and 9 depict a flow chart of an exemplary process 800 according to implementations described herein. As shown in FIG. 8, process 800 may begin with resolving or determining a list of function categories associated with an application and/or displaying the list of function categories (block 810). For example, in one implementation described above in connection with FIG. 3, dynamic function wizard module 330 may resolve or determine a list of function categories associated with technical computing environment module 310, and may generate (e.g., display to the user) the list of function categories.

A user may select a function category, the selection of the function category may be received (block 820), and a list of functions associated with the selected function category may be generated (block 830). For example, in one implementation described above in connection with FIG. 3, if a user selects a function category, dynamic function wizard module 330 may receive the selected function category and may generate (e.g., display to the user) a list of functions associated with the selected function category.

As further shown in FIG. 8, a user may select a function from the list of functions, and the selection of the function may be received (block 840). For example, in one implementation described above in connection with FIG. 4, a user may select user-selected function 400 from the list of functions, and help parser logic 410 of client/server 110/120 may receive user-selected function 400.

Valid function signatures associated with the selected function may be dynamically generated (block 850). Process block 850 may include the process blocks illustrated in FIG. 9. As shown in FIG. 9, process block 850 may include querying a help file associated with the selected function (block 900), and dynamically parsing the help file to generate potential function signatures (block 910). For example, in one implementation described above in connection with FIG. 4, help parser logic 410 may query a help file or header (e.g., provided by technical computing environment module 310) associated with user-selected function 400, and may dynamically parse the help file to generate potential function signatures. In one example, help parser logic 410 may parse a help file associated with user-selected function 400, and/or may parse actual code or instructions associated with user-selected function 400. In another example, help parser logic 410 may parse the help file and/or the actual code associated with user-selected function 400 using a dynamically-typed programming language (e.g., the M language). In other examples, help parser logic 410 may parse the help file and/or the actual code associated with user-selected function 400 using other programming languages (e.g., VBA, C++, C, Fortran, Pascal, etc.).

Still referring to FIG. 9, process block 850 may also include optional filtering of the potential function signatures to generate valid function signatures (block 920). For example, in one implementation described above in connection with FIG. 4, filter logic 420 of client/server 110/120 may receive the potential function signatures from help parser logic 410, and may prescreen any invalid function signatures. In one example, filter logic 420 may attempt to execute functions associated with the potential function signatures. If a potential function signature creates an error (or is invalid) during execution, filter logic 420 may screen or filter out the invalid potential function signature, and may generate a list of valid function signatures.

As further shown in FIG. 9, process block 850 may include formatting the valid function signatures (block 930). For example, in one implementation described above in connection with FIG. 4, function signature format logic 430 of client/server 110/120 may receive the list of valid function signatures from filter logic 420, and may provide formatting for the list of valid function signatures. In one example, function signature format logic 430 may provide mechanisms (e.g., menus, lists, etc.) for creating a list of function categories, a list of functions associated with each function category, a list of valid function signatures associated with each function, and help information associated with each function.

Still referring to FIG. 9, process block 850 may further include, optionally, converting (block 940) and storing (block 950) the formatted, valid function signatures. For example, in one implementation described above in connection with FIG. 4, function signature output logic 440 of client/server 110/120 may convert the formatted information into another format (e.g., may convert a MATLAB® function into a Microsoft Excel macro), and may store the converted information (e.g., within main memory 230, ROM 240, and/or storage device 250 of client/server 110/120).

As further shown in FIG. 9, process block 850 may include outputting the formatted, valid function signatures (block 960). For example, in one implementation described above in connection with FIG. 4, function signature output logic 440 may receive the formatted information from function signature format logic 430, and may provide a variety of output options for the formatted information. In one example, function signature output logic 440 may output one or more function signatures 450. In another example, as described above in connection with FIGS. 5-7, function signature output logic 440 may provide mechanisms (e.g., user interfaces) for displaying the list of function categories, the list of functions associated with each function category, and the list of valid function signatures and help information associated with each function.

Returning to FIG. 8, process 800 may include receiving selection of a valid function signature (block 860), and displaying and receiving inputs associated with the selected valid function signature (block 870). For example, in one implementation described above in connection with FIGS. 5 and 6, if the user selects a valid function signature, dynamic function wizard 510 may permit the user to enter variables associated with the selected function signature using function arguments window 600. Variable input mechanism 610 of function arguments window 600 may include mechanism that may be selected if the user hovers over or clicks on the mechanism. If variable input mechanism 610 is selected, a user may input variables associated with the selected function signature. In one example, if the user selected function 550 and selected "FUNCTION2(M, N)" as the function signature, then variable input mechanism 610 may permit the user to input the variables "M" and "N."

The selected valid function signature (including its inputs) may be provided to an application, and/or may be converted (block 880). For example, in one implementation described above in connection with FIGS. 5 and 6, OK mechanism 630 of function arguments window may cause dynamic function wizard 510 to provide the selected function signature (including the variables input by variable input mechanism 610) to host application 500 (e.g., at cell(s) input by optional output cells input mechanism 630). If build mechanism 570 is selected, dynamic function wizard 510 may convert a function signature of an application (e.g., technical computing environment module 310) into a function signature that may be deployed in host application 500. In one example, dynamic function wizard 510 may convert a MATLAB® function signature into a Microsoft Excel macro.

CONCLUSION

Implementations described herein may provide a function wizard for dynamically generating a list of function signatures associated with an application (e.g., a dynamically-type programming language) accessed by a host application. For example, the dynamic function wizard may resolve or determine a list of function categories associated with the accessed application, and may generate a list of functions associated with each function category. If a user selects a function, the dynamic function wizard may query a help file associated with the selected function, and may dynamically parse the help file to generate potential function signatures. The dynamic function wizard may filter the potential function signatures to generate valid function signatures, may format the valid function signatures, and may output the formatted valid function signatures for selection by the user. If the user selects a valid function signature, the dynamic function wizard may permit the user to enter variables associated with the selected function signature, and may provide the resulting formula to the host application.

The foregoing description of implementations provides illustration and description, but is not intended to be exhaustive or to limit the invention to the precise form disclosed. Modifications and variations are possible in light of the above teachings or may be acquired from practice of the invention.

For example, while a series of acts has been described with regard to FIGS. 8 and 9, the order of the acts may be modified in other implementations. Further, non-dependent acts may be performed in parallel.

Also, the term "user" has been used herein. The term "user" is intended to be broadly interpreted to include a client or a user of a client.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

Further, certain portions of the invention may be implemented as "logic" that performs one or more functions. This logic may include hardware, such as an application specific integrated circuit or a field programmable gate array, software, or a combination of hardware and software.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    determining a list of function categories associated with an application that is accessed by a host application,
        the application being different than the host application,
        determining the list of the function categories being performed by one or more processors;
    generating one or more functions associated with the application based on receiving, via the host application, a selection of a function category that is included in the list of function categories,
        generating the one or more functions being performed by the one or more processors;
    generating one or more function signatures associated with the application based on receiving, via the host application, a selection of a function, of the one or more functions,
        generating the one or more function signatures being performed by the one or more processors; and
    converting the one or more function signatures from a first format that is associated with the application to a second format that is associated with the host application,
        converting the one or more function signatures being performed by the one or more processors.

2. The method of claim 1, where generating the one or more function signatures includes:
    parsing a section of code of the application, and
    generating the one or more function signatures based on parsing the section of code.

3. The method of claim 1, where generating the one or more function signatures includes:
    formatting, by the one or more processors, the one or more function signatures into the first format associated with the application.

4. The method of claim 1, where generating the one or more function signatures includes:
    parsing a help file associated with the application, and
    generating the one or more function signatures based on parsing the help file.

5. The method of claim 1, where generating the one or more function signatures includes:
    generating a first group of function signatures based on receiving the selection of the function;
    executing each function signature, of the first group of function signatures; and
    generating the one or more function signatures based on the executing.

6. The method of claim 1, where the application includes a technical computing environment and the host application includes a non-technical computing environment,
    the method further comprising:
        converting the one or more function signatures from a first format that is associated with the technical computing environment to a second format that is deployable in the non-technical computing environment.

7. The method of claim 1, further comprising:
    outputting the one or more function signatures in the second format via the host application.

8. A system comprising:
    a memory; and
    one or more processors, operatively connected to the memory, to:
        determine a list of function categories associated with an application that is accessed by a host application,
            the application being different than the host application,
        generate one or more functions associated with the application based on receiving, via the host application, a selection of a function category that is identified in the list of function categories, and generate one or more function signatures associated with the function category based on receiving, via the host application, a selection of a function, of the one or more functions,
- where, when generating the one or more function signatures, the one or more processors are to:
  - format the one or more function signatures into a format associated with the host application.

9. The system of claim 8, where the application includes a technical computing environment that comprises at least one of:
- a text-based environment,
- a graphically-based environment, or
- a hybrid environment that includes the text-based environment and the graphically-based environment, and
- where the host application includes a non-technical computing environment that includes at least one of:
  - a program that includes program functions, or
  - a program that is capable of utilizing functions from a dynamically-typed programming language associated with the technical computing environment.

10. The system of claim 8, where the memory stores the one or more function signatures associated with the selected function.

11. The system of claim 8, where, when generating the one or more function signatures, the one or more processors are further to:
- query a help file associated with a second application,
- parse the help file to generate one or more potential function signatures, and
- filter the one or more potential function signatures to generate the one or more function signatures.

12. The system of claim 11, where, when filtering the one or more potential function signatures, the one or more processors are further to:
- execute each of the one or more potential function signatures, and
- filter the one or more potential function signatures based on executing each of the one or more potential function signatures.

13. The system of claim 8, where the one or more processors are further to:
- output the one or more function signatures via the host application.

14. One or more non-transitory computer-readable media storing instructions, the instructions comprising:
- one or more instructions, executable by at least one or more processors, to:
  - determine a list of function categories associated with an application that is accessed by a host application,
    - the application being different than the host application,
  - generate one or more functions associated with the application based on receiving, via the host application, a selection of a function category that is identified in the list of function categories, and
  - generate one or more function signatures associated with the function category based on receiving, via the host application, a selection of a function, of the one or more functions,
    - where the one or more instructions to generate the one or more function signatures include one or more instructions, executable by the at least one or more processors to:
      - format the one or more function signatures into a format associated with the host application.

15. The one or more non-transitory computer-readable media of claim 14, where the application includes a technical computing environment that comprises at least one of:
- a text-based environment,
- a graphically-based environment, or
- a hybrid environment that includes the text-based environment and the graphically-based environment, and
- where the host application includes a non-technical computing environment that includes at least one of:
  - a program that includes program functions, or
  - a program that is capable of utilizing functions from a dynamically-typed programming language associated with the technical computing environment.

16. The one or more non-transitory computer-readable media of claim 14, where the instructions, when generating the one or more function signatures, further comprise:
- one or more instructions, executable by at least one or more processors, to:
  - query a help file associated with a second application,
  - parse the help file to generate one or more potential function signatures, and
  - filter the one or more potential function signatures to generate the one or more function signatures.

17. The one or more non-transitory computer-readable media of claim 16, where the instructions, when filtering the one or more potential function signatures, further comprise:
- one or more instructions, executable by at least one or more processors, to:
  - execute each of the one or more potential function signatures, and
  - filter the one or more potential function signatures based on executing each of the one or more potential function signatures.

18. The one or more non-transitory computer-readable media of claim 14, where the instructions further comprise:
- one or more instructions, executable by at least one or more processors, to:
  - output the one or more function signatures via the host application.

19. The one or more non-transitory computer-readable media of claim 14, where the instructions further comprise:
- one or more instructions, executable by at least one or more processors, to:
  - cause the one or more formatted function signatures to be displayed via a client device associated with the host application.

* * * * *